May 18, 1948. V. C. HUFF 2,441,817
SEALING TONGS
Filed April 26, 1946

INVENTOR.
Victor C. Huff,
BY George D. Richards,
Attorney

Patented May 18, 1948

2,441,817

UNITED STATES PATENT OFFICE 2,441,817

SEALING TONGS

Victor C. Huff, Bloomfield, N. J.

Application April 26, 1946, Serial No. 665,226

1 Claim. (Cl. 219—21)

1

This invention relates to an improved device in the form of a hand implement for sealing the mouths of Cellophane bags, and especially such bags when utilized to enclose food products for cold storage preservation.

The invention has for an object to provide a novel construction of hand manipulatable, electrically heated sealing tongs adapted to receive the mouth end portion of a Cellophane bag between the jaws thereof, said tongs thereupon being manipulatable to close together the mouth walls of the bag, and, by application of heat and pressure thereto, to cause the same to adhere one to the other in hermetically sealed relation, so as to exclude air from the interior of the bag and its content.

The invention has for another object to provide a sealing tongs for the purposes stated which is of very simple construction, comprising a pair of chambered jaw shells hinged together at their rear ends in a novel manner, the forward portions of the jaw shells being open one toward the other, and having affixed therein opposed crimper members, at least one of which contains an electrical heating unit; the rear ends of said jaw shells having external hand grip sections affixed thereto.

Other objects of this invention, not at this time more particularly enumerated, will be understood from the following detailed description of the same.

An illustrative embodiment of the invention is shown in the accompanying drawings, in which—

Figure 1:
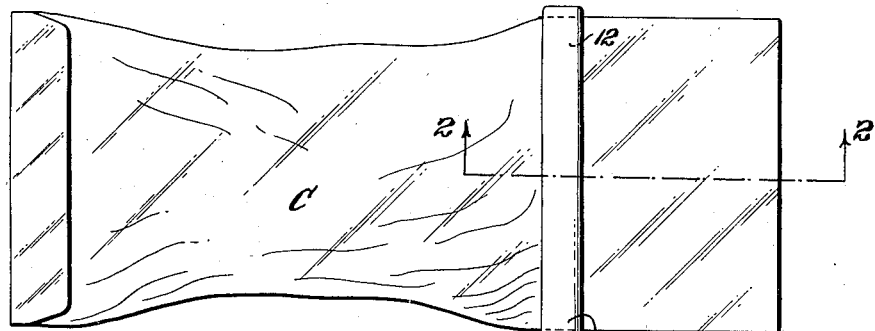
Figure 2:
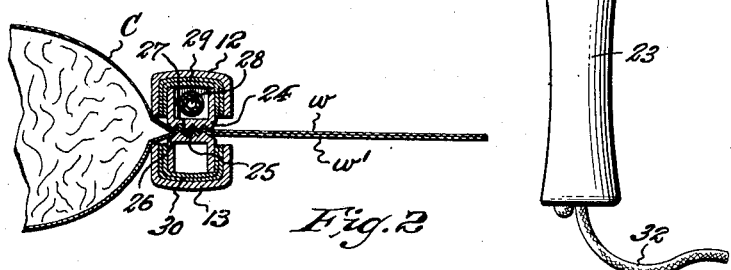
Figure 3:
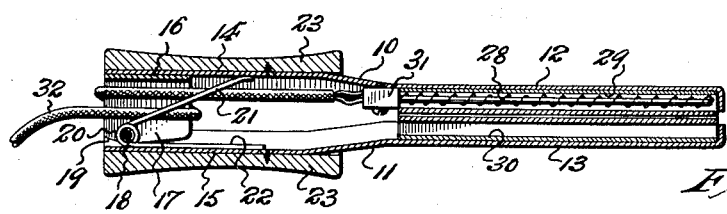
Figure 4:
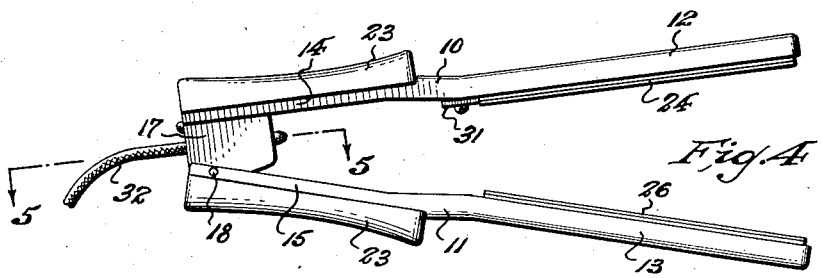
Figure 5:
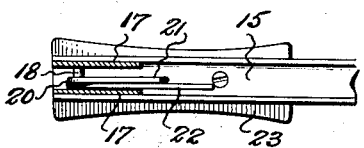

Fig. 1 is a top plan view of the novel sealing tongs of the invention as operatively applied to the mouth of a Cellophane bag for closing and sealing the same; Fig. 2 is a transverse sectional view, taken on line 2—2 in Fig. 1, but drawn on a somewhat enlarged scale; Fig. 3 is a central longitudinal sectional view of the sealing tongs, in closed condition; Fig. 4 is a side elevational view of the sealing tongs in open condition; and Fig. 5 is a fragmentary horizontal sectional view, taken on line 5—5 in Fig. 4.

Similar characters of reference are employed in the hereinabove described views, to indicate corresponding parts.

Referring to the drawings, the novel sealing tongs structure according to this invention comprises a pair of longitudinally extending body shells 10 and 11, each of U-shape cross-section, and preferably made of sheet metal. The forward end portion of the body shell 10 provides a tongs jaw section 12, and, in like manner, the forward end portion of the body shell 11 provides

2 a tongs jaw section 13. The rearward end portion of the body shell 10 is formed to provide a handle portion 14 which is outwardly offset relative to the longitudinal axis of its jaw section 12, and, in like manner, the rearward end portion of the body shell 11 is also formed to provide a handle portion 15 which is outwardly offset relative to the longitudinal axis of its jaw section 13.

Secured within the embrace of the rear end portion of one body shell, e. g., the handle portion 14 of the body shell 10, is a U-shaped hinging member 16 of substantial length, the same having side flanges 17 which project outwardly from the interior of said handle portion 14. Said hinging member 16 is located adjacent to the rearward extremity of said handle portion 14 of the body shell 10, and its flanges 17 are adapted to extend into the interior of the handle portion 15 of the opposed body shell 11, respectively contiguous to the side walls thereof. A hinge pin 18 extends transversely through said side walls of the handle portion 15 and through said flanges 17 of the hinging member 16, thereby pivotally connecting together the rear end portions of the body shells 10 and 11 in such relation that their interior chambers open one toward the other. The end edges of said flanges 17 are of convex or arched conformation, whereby, at least their rearward portions diverge from the bottom plane of the handle portion 15 of the body shell 11, when the body shells are swung to jaw section closed relation, whereby to provide stop portions 19 for limiting outswinging movements of said body sections to jaw section opened relation. A torsion spring means 20 is mounted around the hinge pin 18, so that one leg 21 thereof thrusts against the body shell 10 and the other leg 22 thereof against the body shell 11, whereby to yieldably swing apart said body shells to jaw section opened relation. Affixed to the exteriors of the respective handle portions 14 and 15 are suitably shaped hand grip sections 23, which may be made of molded plastic material, wood, or any other suitable material which is preferably a poor conductor of heat.

Affixed in the interior of the tongs jaw section 12, so as to project somewhat from the open inner side thereof, is a metallic crimper member 24 having a longitudinally corrugate exterior face 25. In like manner, affixed in the interior of the tongs jaw section 13, so as to project somewhat from its open inner side, is a like metallic crimper member 26 having a longitudinally corrugate exterior face 27, the male corrugations of which are disposed to match with and dovetail into the female corrugate portions of the opposed crimper member 25, when the tongs jaw sections 12 and 13 are closed together.

Suitably mounted and affixed within one of the crimper members, e. g., within the crimper member 24, is an electrical heater element 28 of any suitable kind or structure, whereby to extend along the face portion of said crimper member 24 so as to radiate its heat thereto when energized. Interposed between the crimper member 24 and the contiguous walls of the tongs jaw section 12 are one or more layers of heat insulating material 29, such, e. g., as sheet asbestos, whereby the heat of the heater element 28 is conserved and concentrated upon the crimper member 24. It is desirable, although not absolutely essential, to provide a like interposed lining of heat insulating material 30, such, e. g., as sheet asbestos, intermediate the crimper member 26 and the contiguous walls of the tongs jaw section 13. Affixed to the body shell 10, adjacent to the inner end of the tongs jaw section 12, is a connector block 31, whereby the electrical connections of the conductors of a cable or cord 32 may be properly insulated from the body shell 10. Said cable or cord 32 extends rearwardly between and outwardly from the handle portions 14—15 of the tongs, and is fitted at its free extremity with a plug connector (not shown) for electrically coupling the cable or cord and the heating element 28 in circuit with a source of electrical energy, in manner well known to the art.

In the use of the sealing tongs, after a bag-like container c, such as one of Cellophane, capable of sealing upon itself under application of heat and pressure, is filled with a content of material desired to be enclosed therein, the mouth walls w—w' are brought flatly together in face to face contact, whereupon the thus closed mouth wall portions are inserted between the open tongs jaw sections 12—13. Current being supplied to the heater element 28, the body shells 10—11 are swung toward each other by grasping and squeezing together the hand grip sections 23, thus closing the tongs jaw sections 12—13 against opposite sides of the engaged container mouth walls w—w'. The corrugate faces of the crimper members 24—26 will crimp the engaged meeting walls w—w', while at the same time heat from the heater element 28, transfers heat through the crimper member to said walls whereby to cause the latter to firmly adhere together, and thus close and hermetically seal the container.

One marked advantage of the sealing tongs is that it may be easily and quickly operatively applied to the container mouth portion at any desired point distant from the open end thereof. This makes it possible to seal the container mouth portion close to the container content, no matter to what extent said content fills the container. As a consequence of this residual air trapped within the container is reduced to a minimum, thus better assuring the keeping condition of the container content.

It will be noted that the substantial lengths of the flanges 17 of the hinge element 16 as moving to the sides of the body shell 11, provide a considerable area of contact, whereby the tong jaw sections are prevented from becoming misaligned, and consequently, are positively maintained for accurate meeting engagement.

It will be obvious that the novel sealing tongs is very simple in construction, and is easy and quick to apply to and operate in connection with containers desired to be closed and sealed thereby.

Having now described my invention, I claim:

A sealing tongs comprising a pair of elongated body shells of U-shaped cross section relatively disposed with their open faces opposed, the forward end portions of said body shells being adapted to provide opposed jaw sections, a U-shaped hinging member of substantial length having its closed end affixed to and within the rear end portion of one body shell with its side portions extending into the opposite body shell contiguous to the wide walls of the latter, a transverse hinge pin extending through the side portions of said hinging member and the contiguous side walls of said last mentioned body shell, whereby to pivotally join said body shells for relative swinging movements, free end margins of the side portions of said hinging member having portions rearwardly extending from a point adjacent to the hinge pin in divergent relation to the plane of the transverse outer wall of said last mentioned body shell, whereby to abut the latter to limit relative outswinging movements of said body shells, spring means to yieldably outswing said body shells to stopped positions, each jaw section having an elongated crimper member affixed therein so as to project from the open inner side thereof, at least one said crimper member having an electrical heater element housed therein, and external hand grip sections affixed to the rear end portions of the body shells.

VICTOR C. HUFF.

REFERENCES CITED

The following references are of record in the file of this patent:

UNITED STATES PATENTS

| Number | Name | Date |
| --- | --- | --- |
| 1,449,632 | Talbot | Mar. 27, 1923 |
| 1,455,696 | Wright | May 15, 1923 |
| 1,465,838 | Caneavri | Aug. 21, 1923 |
| 2,262,480 | Waters | Nov. 11, 1941 |